(12) United States Patent
Cinpinski et al.

(10) Patent No.: US 8,019,526 B2
(45) Date of Patent: Sep. 13, 2011

(54) ADAPTER PHASOR CONTROL HOLD DUTY CYCLE SYSTEM FOR AN ENGINE

(75) Inventors: Kenneth J. Cinpinski, Ray, MI (US);
Ljubisa M. Mladenovic, Ann Arbor, MI (US); Jerry W. Kortge, Clarkston, MI (US); Gregory J. York, Fenton, MI (US)

(73) Assignee: GM Global Technology Operations LLC

( * ) Notice: Subject to any disclaimer, the term of this patent is extended or adjusted under 35 U.S.C. 154(b) by 592 days.

(21) Appl. No.: 12/132,241

(22) Filed: Jun. 3, 2008

(65) Prior Publication Data
US 2009/0145384 A1    Jun. 11, 2009

Related U.S. Application Data

(60) Provisional application No. 61/012,149, filed on Dec. 7, 2007.

(51) Int. Cl.
*F01L 1/34* (2006.01)
*F02D 41/34* (2006.01)
(52) U.S. Cl. .................................. 701/103; 123/90.17
(58) Field of Classification Search .................. 701/103, 701/115, 102; 123/90.15, 90.17, 90.31, 90.34
See application file for complete search history.

(56) References Cited

U.S. PATENT DOCUMENTS

| 5,680,834 | A  | * | 10/1997 | Szpak et al. | 123/90.15 |
| 6,336,302 | B1 |   | 1/2002 | Brugman et al. | |
| 6,536,389 | B1 |   | 3/2003 | Shelby et al. | |
| 2009/0223472 | A1 | * | 9/2009 | Cinpinski et al. | 123/90.17 |

FOREIGN PATENT DOCUMENTS

| EP | 1 400 785 A2 | * | 3/2004 |
| EP | 1512845 A1 | | 3/2005 |

* cited by examiner

*Primary Examiner* — Hieu T Vo

(57) ABSTRACT

A camshaft phasor control system for an engine includes a camshaft position sensor that generates a current camshaft position signal based on position of a camshaft. A first comparator generates a camshaft position signal based on the current camshaft position signal and a crankshaft position. The second comparator generates an error signal based on the relative camshaft position signal and a commanded camshaft position signal. A control module determines a current control hold duty cycle (CHDC) for a camshaft phasor based on an engine state parameter. The control module also generates a correction signal based on the error signal, adjusts the current CHDC based on the correction signal to generate a commanded CHDC signal, and generates another CHDC based on the commanded CHDC signal.

20 Claims, 5 Drawing Sheets

ADAPTER PHASOR CONTROL HOLD DUTY CYCLE SYSTEM FOR AN ENGINE

CROSS-REFERENCE TO RELATED APPLICATIONS

This application claims the benefit of U.S. Provisional Application No. 61/012,149, filed on Dec. 7, 2007. The disclosure of the above application is incorporated herein by reference in its entirety.

FIELD

The present invention relates to engine control and, more particularly, to camshaft position control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A camshaft actuates valves of an internal combustion engine. In a dual overhead camshaft configuration, the engine includes an exhaust camshaft and an intake camshaft for each bank of cylinders. Rotation of the camshafts actuates intake and exhaust valves of the engine. Timing of valve events can influence airflow, trapped residuals, and spark advance sensitivity, which may improve engine efficiency in fuel consumption and pollutant exhaustion.

An engine control system may include one or more camshaft phasing devices (camshaft phasors). A camshaft phasor may be used to create a continuously variable rotational offset between the exhaust camshaft and the intake camshaft and/or the crankshaft, which alters opening and closing time between intake and exhaust valves.

A camshaft phasor based control system typically includes a control valve and a phasor. The control valve is used to adjust passage of hydraulic fluid to the phasor based on a commanded position signal. The flow of hydraulic fluid controls movement of a vane within the phasor and thus relative positioning between camshafts and/or a crankshaft. Once the cam phasor is in the commanded position, fluid flow to both sides of the actuator are balanced, thereby locking the camshaft phasor in a fixed position. This control valve position is referred to as a control hold position.

The positioning of the control valve is achieved by varying the energy supplied to a solenoid which moves the control valve via a control duty cycle signal. Typically, a control hold duty cycle (CHDC) is based on a regression model that is calculated during development of a vehicle. The CHDC is calculated from a regression model that is developed over time via vehicle testing and post processing of test data. Once developed, the regression model is stored in a camshaft phasor control system of a vehicle and is unchanged. Due to component wear, accuracy of the regression model decreases over time.

SUMMARY

A camshaft phasor control system for an engine is provided and includes a camshaft position sensor that generates a current camshaft position signal based on position of a camshaft. A first comparator generates a camshaft position signal based on the current camshaft position signal and a crankshaft position. The second comparator generates an error signal based on the relative camshaft position signal and a commanded camshaft position signal. A control module determines a current control hold duty cycle (CHDC) for a camshaft phasor based on an engine state parameter. The control module also generates a correction signal based on the error signal, adjusts the current CHDC based on the correction signal to generate a commanded duty cycle signal, and generates another CHDC based on the commanded duty cycle signal. The commanded duty cycle signal may be generated and/or stored after position error associated with the error signal is mitigated.

In another feature, an adaptive camshaft phasor control system for an engine includes memory that stores control hold duty cycle (CHDC) values. A camshaft position sensor generates a current camshaft position signal based on position of a camshaft. A first comparator generates a relative camshaft position signal based on the current camshaft position signal and a crankshaft position. A second comparator generates an error signal based on the relative camshaft position signal and a commanded camshaft position signal. A control module determines a CHDC value for a camshaft phasor based on an engine state parameter. The control module also generates a correction signal based on the error signal, adjusts the CHDC value based on the correction signal to generate a commanded duty cycle signal, and stores the commanded duty cycle as the CHDC signal in the memory. The commanded duty cycle signal may be generated and/or stored after position error associated with the error signal is mitigated.

In still another feature, a method of operating a camshaft phasor control system includes determining a control hold duty cycle (CHDC) for a camshaft phasor based on an engine state parameter. A commanded camshaft position signal is generated. A current camshaft position is determined relative to a crankshaft. An error signal is generated based on the commanded camshaft position signal and the current camshaft position. A correction signal is generated based on the error signal. The CHDC is adjusted based on the correction signal to generate a commanded duty cycle signal. The commanded duty cycle signal is stored in memory.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
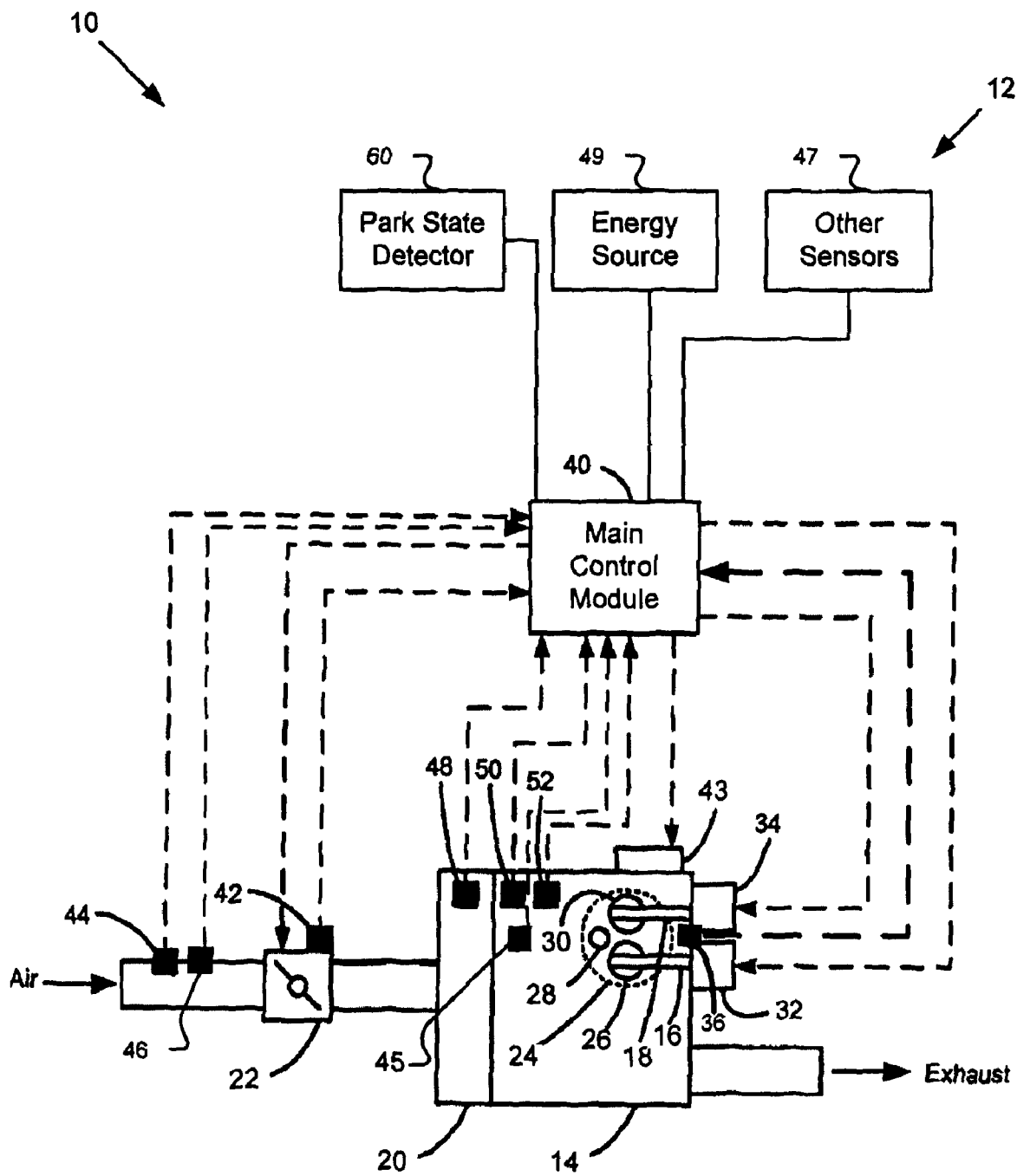
FIG. 1 is a functional block diagram of an engine control system that incorporates a camshaft phasor control system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The below described embodiments provide systems and circuits for adaptively learning an appropriate control signal to position a valve shuttle of a phasor to a control hold position. This eliminates the need for a regression model to calculate a control hold duty cycle and associated calibration of that model. The systems and circuits have reduced sensitivity to voltage, temperature and component build variations. In addition, the systems and circuits enable less stringent design requirements on phasors.

Referring now to FIG. 1, a functional block diagram of an engine control system 10 that incorporates a camshaft phasor control system 12 is shown. An engine control system 10 includes an engine 14 that has one or more camshafts 16, 18. Position of the camshafts 16, 18 is controlled via the camshaft phasor control system 12. The camshaft phasor control system 12 is tuned based on known camshaft phasor control circuit characteristics and closed loop system performance, which may be obtained from engine performance improvement information. The camshaft phasor control system 12 adaptively determines a commanded control hold duty cycle (CHDC) during operation of the engine 14. The control hold duty cycle is applied to an oil control valve of a phasor to block oil flow to either side of a vane within the phasor. To adjust the position of a phasor and to eliminate measured position error, proportional and integral modifiers are used. This is described further below. The camshaft phasor control system 12 learns over time an appropriate CHDC for current engine operating conditions and states. The CHDC values are stored and may be used and updated during a current operating event of the vehicle and/or used during a future operating event.

The camshaft phasor system characteristics may include gain, time constants, delay times, and other camshaft phasor characteristics. The engine performance improvement information may refer to camshaft and crankshaft position information, spark ignition, fuel injection, air flow, and other engine performance parameters. The camshaft phasor control system 12 has scheduled gains for control of one or more camshaft phasors to provide closed loop phase and gain margins that satisfy a given robustness criteria.

In use, the engine control system 10 allows air to be drawn into an intake manifold 20 through a throttle 22. The throttle 22 regulates mass air flow into the intake manifold 20. Air within the intake manifold 20 is distributed into cylinders 24. Although a single cylinder 24 is illustrated, it is appreciated that the camshaft phasor control system 12 may be implemented in engines having any number of cylinders.

An intake valve 26 selectively opens and closes to enable the air/fuel mixture to enter the cylinder 24. The intake valve position is regulated by an intake camshaft 16. A piston compresses the air/fuel mixture within the cylinder 24. A spark plug 28 initiates combustion of the air/fuel mixture, driving the piston in the cylinder 24. The piston drives a crankshaft to produce drive torque. Combustion exhaust within the cylinder 24 is forced out an exhaust port when an exhaust valve 30 is in an open position. The exhaust valve position is regulated by an exhaust camshaft 18. The exhaust is treated in an exhaust system and is released to the atmosphere. Although single intake and exhaust valves 26, 30 are illustrated, it is appreciated that the engine 14 can include multiple intake and exhaust valves 26, 30 per cylinder 24.

The engine system 10 further includes an intake camshaft phasor 32 and an exhaust camshaft phasor 34 that respectively regulate the rotational timing of the intake and exhaust camshafts 16, 18. More specifically, the timing of the intake and exhaust camshafts 16, 18 can be retarded or advanced with respect to each other or with respect to a location of the piston within the cylinder 24 or crankshaft position. The intake and exhaust camshaft phasors 32, 34 regulate the intake and exhaust camshafts 16, 18 based on signal output from one or more camshaft position sensors 36.

The camshaft position sensors 36 may be in the form of a camshaft target wheel sensor and measure the relative position of edges on that wheel. The camshaft position sensors 36 can include, but is not limited to, a variable reluctance or Hall Effect sensors. In one embodiment, the camshaft position sensors 36 are encoders that detect teeth on a rotating sprocket of the camshafts 16, 18. The camshaft position sensors 36 transmit output signals that indicate rotational position of the intake or exhaust camshafts 16, 18. The transmission may occur when the camshaft position sensors 36 sense the passage of a spaced position marker (e.g. tooth, tab, and/or slot) on a disc or target wheel coupled to the intake or exhaust camshafts 16, 18.

Figure 2:
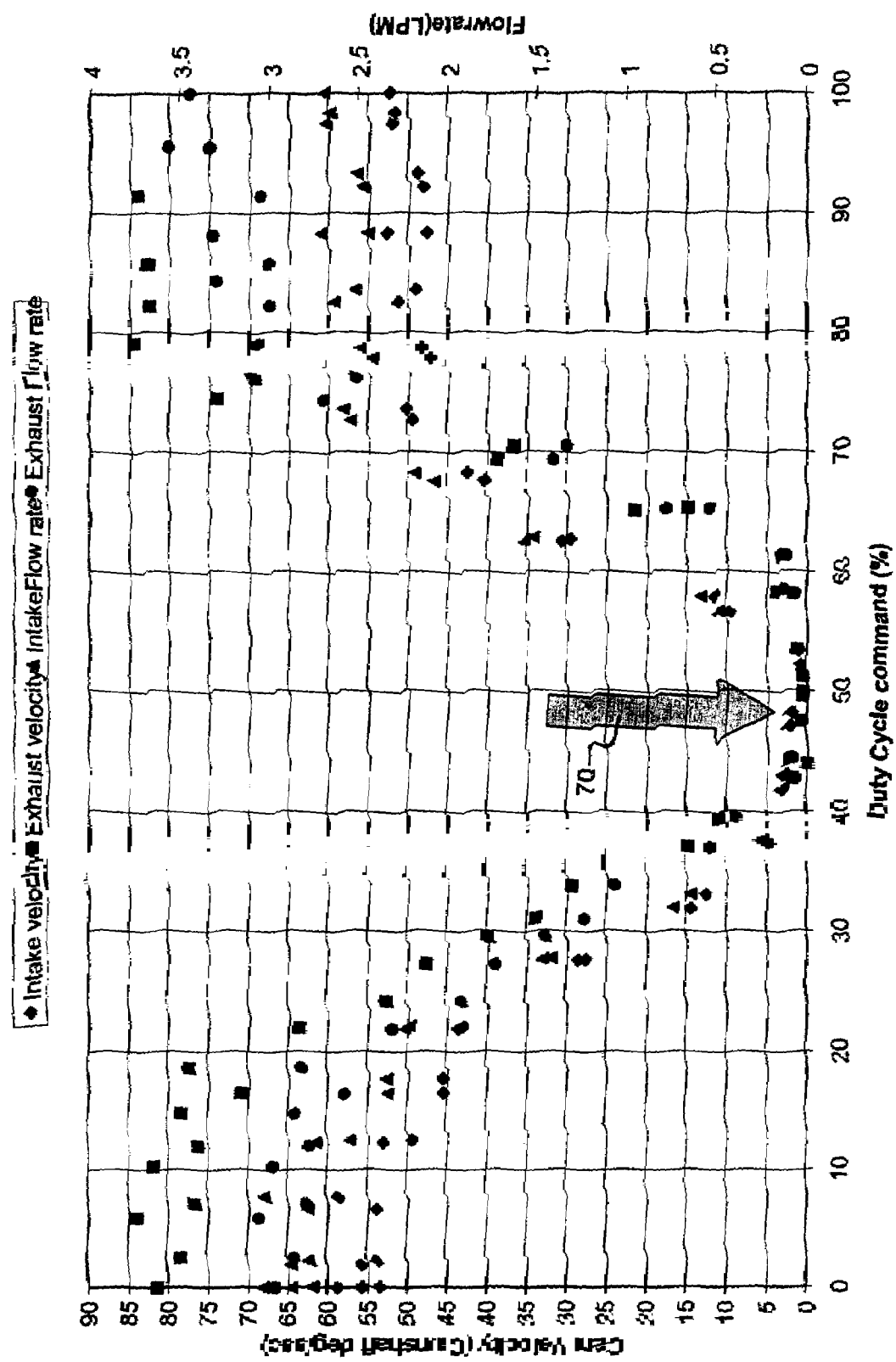
FIG. 2 is an intake and exhaust camshaft velocity versus duty cycle plot.

A main control module 40 operates the engine based on the camshaft phasor control system 12. The main control module 40 may include a position control module, a gain scheduling module, and a gain calculation module, which are best seen in FIG. 2. The main control module 40 generates control signals to regulate engine components in response to engine operating conditions. The main control module 40 generates a throttle control signal based on a position of an accelerator pedal and a throttle position signal generated by a throttle position sensor (TPS) 42. A throttle actuator adjusts the throttle position based on the throttle control signal. The throttle actuator may include a motor or a stepper motor, which provides limited and/or coarse control of the throttle position.

The main control module 40 also regulates a fuel injection system 43 and the camshaft phasors 32, 34. The main control module 40 determines the positioning and timing (e.g. phase) between the intake or exhaust camshafts (intake or exhaust valves) 16, 18 and the crankshaft based on the output of the camshaft position sensors 36 and other sensors 47. For example, the positioning and timing may be conditioned based on a temperature signal from a hydraulic temperature sensor 45 and/or a voltage of an energy source 49. The temperature sensor 45 may provide temperature of oil within the engine 14 and/or in a camshaft phasor control circuit, such as that shown in FIG. 2. The other sensors may include the sensors mentioned below.

An intake air temperature (IAT) sensor 44 is responsive to a temperature of the intake air flow and generates an intake air temperature signal. A mass airflow (MAF) sensor 46 is responsive to the mass of the intake air flow and generates a MAF signal. A manifold absolute pressure (MAP) sensor 48 is responsive to the pressure within the intake manifold 20 and generates a MAP signal. An engine coolant temperature sensor 50 is responsive to a coolant temperature and generates an engine temperature signal. An engine speed sensor 52 is responsive to a rotational speed of the engine 14 and generates an engine speed signal. Each of the signals generated by the sensors is received by the main control module 40.

The camshaft phasor control system 12 further includes a park state detector. The park state detector 60 detects when the engine is in a park state. The park state refers to when the engine is initially started and the vehicle is not moving. The park state detector 60 indicates that the camshafts 16, 18 are at initial startup positions, which may be default at rest positions. For example, upon shutdown of the engine 14 the intake and exhaust camshafts 16, 18 may be forced to known fixed predetermined positions. Also, upon startup of the engine, initial predetermined CHDC values may be used during camshaft phasor control. The predetermined CHDC values may be default values or values stored during a previous operating event. The park state detector 60 may include an engine sensor, a transmission sensor, an ignition sensor, etc. The park state detector 60 may be part of the control module 40.

Referring now also to FIG. 2, an intake and exhaust camshaft velocity versus commanded duty cycle plot is shown. The plot includes intake velocity, exhaust velocity, intake flow rate, and exhaust flow rate example data plots for a normal operating temperature. The intake and exhaust plots represent relative change in velocity of a camshaft with respect to a crankshaft. At approximately 50% commanded duty cycle, as designated by arrow 70, the relative camshaft velocities are approximately zero. At this point, a valve shuttle of an associated phasor is in a fixed position and hydraulic fluid is not entering or leaving the phasor.

A technique for modulating energy to an electrical device is to vary the duty cycle in percent or the amount of time a switching control signal is applied to the device. When the frequency of the switching control signal is significantly higher than the natural frequency of the device, the device acts as an integrator. The position of the device is adjusted to a point corresponding to the average energy being applied.

Hydraulic camshaft phasor movement and positioning is achieved by controlling the flow of oil to an actuator. The flow control is performed by supplying oil to one side of a valve shuttle of the phasor while providing a path for the oil on the other side of the valve shuttle to vent or return to a reservoir. Once the valve shuttle has moved to a commanded position, a control valve is adjusted to a position which closes supply and return ports of the valve, trapping the fluid in the phasor and locking the valve shuttle in a fixed position. This position is referred to as the control hold position. The positioning of the valve shuttle is achieved by varying the energy supplied to a solenoid of the control valve, which moves the valve shuttle. This positioning is further described with respect to the embodiment of FIG. 3.

Figure 3:
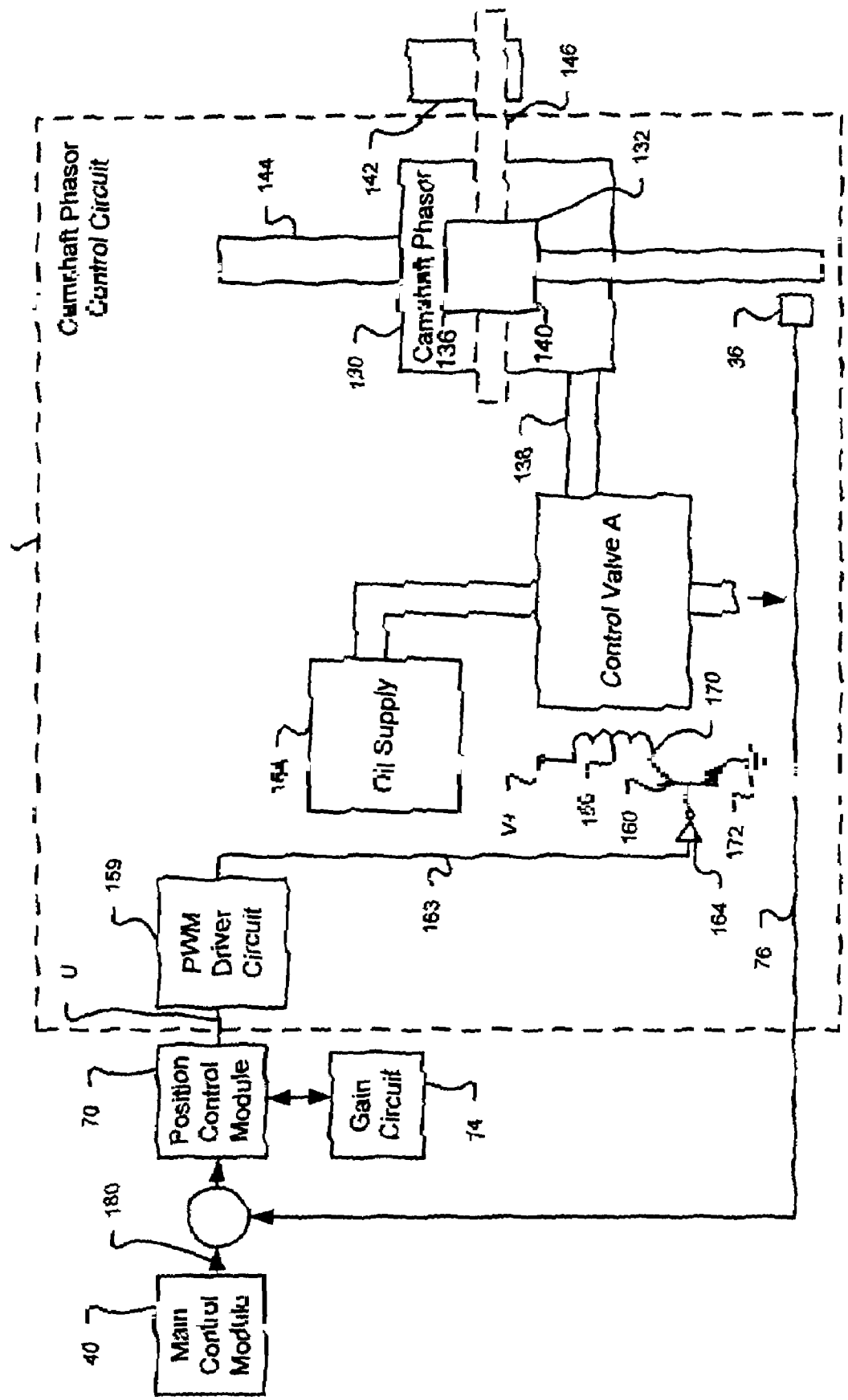
FIG. 3 is a functional block diagram illustrating an exemplary camshaft phasor actuation system in accordance with an embodiment of the present disclosure.

Referring to FIG. 3, a functional block diagram illustrating an exemplary camshaft phasor actuation sub-system 72 is shown. The actuation sub-system 72 controls position of a phasor (hydraulic actuator) 130, which may include a rotor (valve shuttle) 132, to provide for linear positioning thereof along a range of motion. The rotor 132 may move bi-directionally. The rotor 132 may move in a first direction when hydraulic fluid pressure from passage 134 is applied to a first side 136 of the rotor's vanes 132. The rotor 132 may move in a reverse direction of motion when fluid pressure from second passage 138 is applied to a second side 140 of the rotor's vanes 132. The rotor 132 moves, as influenced by hydraulic pressure applied thereto. The phasor 132 varies angular relationship between an engine crankshaft 142 and camshaft 144. For example, the rotor 132 may be attached, via a paired block configuration or a helical spline configuration, to a toothed wheel. A chain 146 may be disposed on the toothed wheel and linked to the crankshaft 142. The phasor 130 is mechanically linked to the camshaft 144.

A control valve A is positioned to admit a varying quantity of hydraulic fluid through a passage 138. The relative oil flow to the sides determines the steady state position of the rotor 132. Precise rotor positioning along a continuum of positions within the stator of phasor 130 is provided through precise control of the relative position of the control valve A. The control valve A receives hydraulic fluid, such as conventional engine oil, from an oil supply system 154. The oil supply system 154 may include an oil pump, which draws hydraulic fluid from a reservoir and passes the fluid to an inlet side of the control valve A at a regulated pressure. The control valve A may be a three-way valve that has a linear and magnetic field-driven solenoid.

The control valve A is positioned based on current provided to a coil 156. In a rest position, the control valve A is positioned to vent out fluid away from the rotor 132, such that position of the rotor 132 is not influenced by fluid flow. As the control valve A is actuated away from its rest position, a portion of the vented fluid is directed to the corresponding sides and displacement of the rotor 132.

Pulse width modulation (PWM) control is provided by current control of the coil 156 via a PWM driver circuit 159. The PWM driver circuit converts the position control signal U into a PWM signal 163. The coil 156 is activated via transistor 160. The PWM signal 163 is passed to the transistor 160. The PWM signal 163 may be a variable duty cycle signal and be similar to a limited and converted version of the position control signal U. The PWM signal 163 is applied to the bases of the transistor 160.

The transistor 160 is connected between a low side 170 of the coil 156 and a ground reference 172. A high side 174 of the coil 156 is electrically connected to a supply voltage V+. The control valve A is held, for a given duty cycle, in a fixed position corresponding to the average current in the coil 156.

The position of the rotor 132 is detected by the camshaft position sensor 36, and may be positioned in proximity to the rotor 132 to sense rotor movement. The camshaft position signal 76 is feedback to the main control module 40. The main control module 40, through execution of periodic control operations, may generate camshaft position command signals 180 to determine hydraulic lag in the actuation sub-system 72. The difference is calculated between the position command signal 180 and the camshaft position signal 76 and provided to a position control module 70. The position control module 70 is coupled to a gain circuit 74 and to a PWM driver circuit 163. The PWM driver circuit 163 generates the PWM signal 163 based on a position control signal U.

The position control module 70 adjusts the position control signal U in a controlled manner to overcome hydraulic lag, to provide a responsive position control of the rotor 132 without oscillation, overshoot, and/or response delay. The position control signal U and the camshaft position command signals 180 may be generated, for example as a predetermined function incorporating engine parameters, such as engine speed, load, and intake pressure. The PWM signal 163 is generated with an appropriate phasing between the camshaft and crankshaft. As an example, a comparison between an amount of change in the PWM signals and resulting change in the camshaft position signal 76 over a predetermined transient response period of time may be used to generate a transient response transfer function. As another example, the rate of reduction in the position error signal may indicate system responsiveness.

Figure 4:
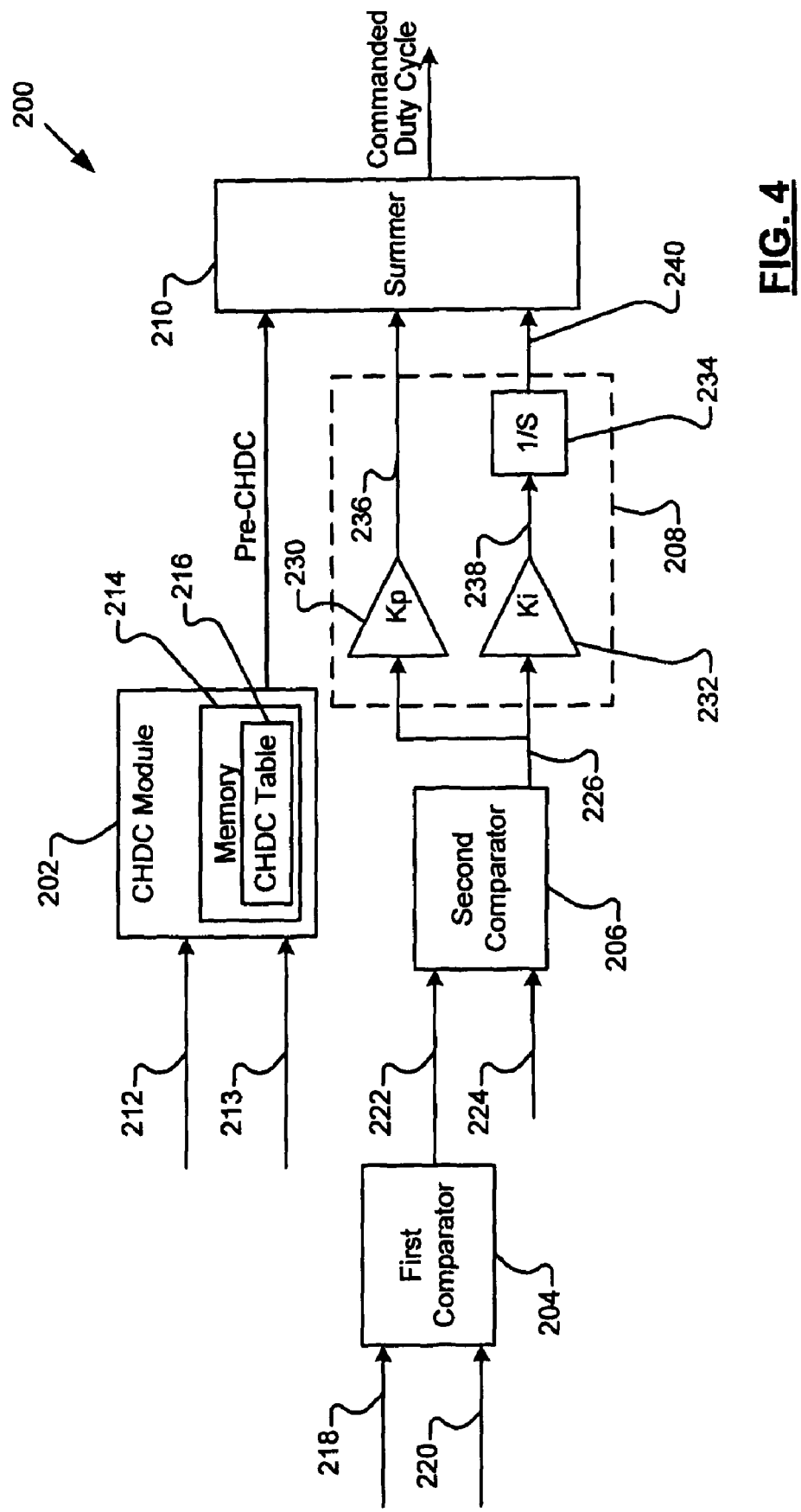
FIG. 4 is a functional block diagram of a camshaft phasor control circuit in accordance with an embodiment of the present disclosure.

Referring to FIG. 1 and to FIG. 4, which shows a functional block diagram of a camshaft phasor control circuit 200. Although the camshaft phasor control circuit 200 is shown and primarily described with respect to a single camshaft phasor, it may be modified for multiple camshaft phasors. The camshaft phasor control circuit 200 includes a CHDC module 202, a first comparator 204, a second comparator 206, a proportional integral circuit 208, and a summer 210, which may each be part of a single control module or integrated circuit, or may be stand alone components. Also, a control module, such as the control module 40, may include more than one of the camshaft phasor control circuits 200.

The CHDC module 202 receives one or more state parameter signals. In the embodiment shown, the CHDC module receives a voltage signal 212 that indicates voltage of an energy source and an oil temperature signal 213. The voltage signal 212 may be representative of a voltage received by a solenoid of a control valve associated with a phasor. The oil temperature signal may be generated by the temperature sensor 45. The CHDC module 202 determines CHDC values based on the state parameter signals. In one embodiment, the CHDC module 202 includes a memory 214, such as a volatile or non-volatile memory. The memory 214 stores a lookup table 216 that relates the received state parameter signals to CHDC values. The lookup table 216 may be initially generated and stored during manufacturing of a vehicle or may be generated during operation of the vehicle. The lookup table 216 is updated during operation of the vehicle. Updated data may be stored in the lookup table 216 in association with a specific operating event and used during other operating events.

The first comparator 204 determines a camshaft angular position relative to a crankshaft, such as the crankshaft 142. The first comparator 204 receives a current camshaft position signal 218, which may be from a camshaft sensor or a control module, such as the camshaft sensor 36 and the control module 40. The first comparator 204 also similarly receives a crankshaft position signal 220, which may be generated by a crankshaft sensor or by a control module.

The second comparator 206 receives the relative camshaft angular position 222 and a commanded camshaft angular position 224. The commanded camshaft angular position 224 may be generated by a control module, such as the control module 40, and based on various engine states and demands on the engine 14. The commanded camshaft angular position 224 may be generated, for example, based on demanded power output of the engine 14, emission control, fuel economy, etc. The second comparator 206 subtracts the current camshaft angular position 222 from the commanded camshaft angular position 224 to generate a camshaft angular position error signal 226.

The proportional integral circuit 208 receives the camshaft angular position error signal 226 and generates one or more correction signals. The proportional integral circuit 208 includes a proportional gain device 230, an integral gain device 232 and an integrator 234. In the embodiment shown, the proportional gain device 230 generates a proportional gain or first correction signal 236 based on the error signal 226. The variable K may refer to a coefficient value that is a predetermined percentage associated with how much to adjust the duty cycle value. The integral gain device 232 generates an integral gain signal 238 based on the error signal 226. The integrator 234 integrates the integral gain signal 238 to generate a second correction signal 240. The proportional integral circuit 208 may be in the form of a series or parallel proportional integral (PI) or proportional integral derivative (PID) controller. Thus, the camshaft phasor control system 12 may be considered as an electro-hydraulic system, which is a first order system with an integrator.

The summer 210 sums the outputs of the CHDC module 202 and the proportional integral circuit 208 to generate a commanded duty cycle signal, which is provided to a solenoid of a camshaft phasor, such as one of the solenoids of control valve A.

Figure 5:
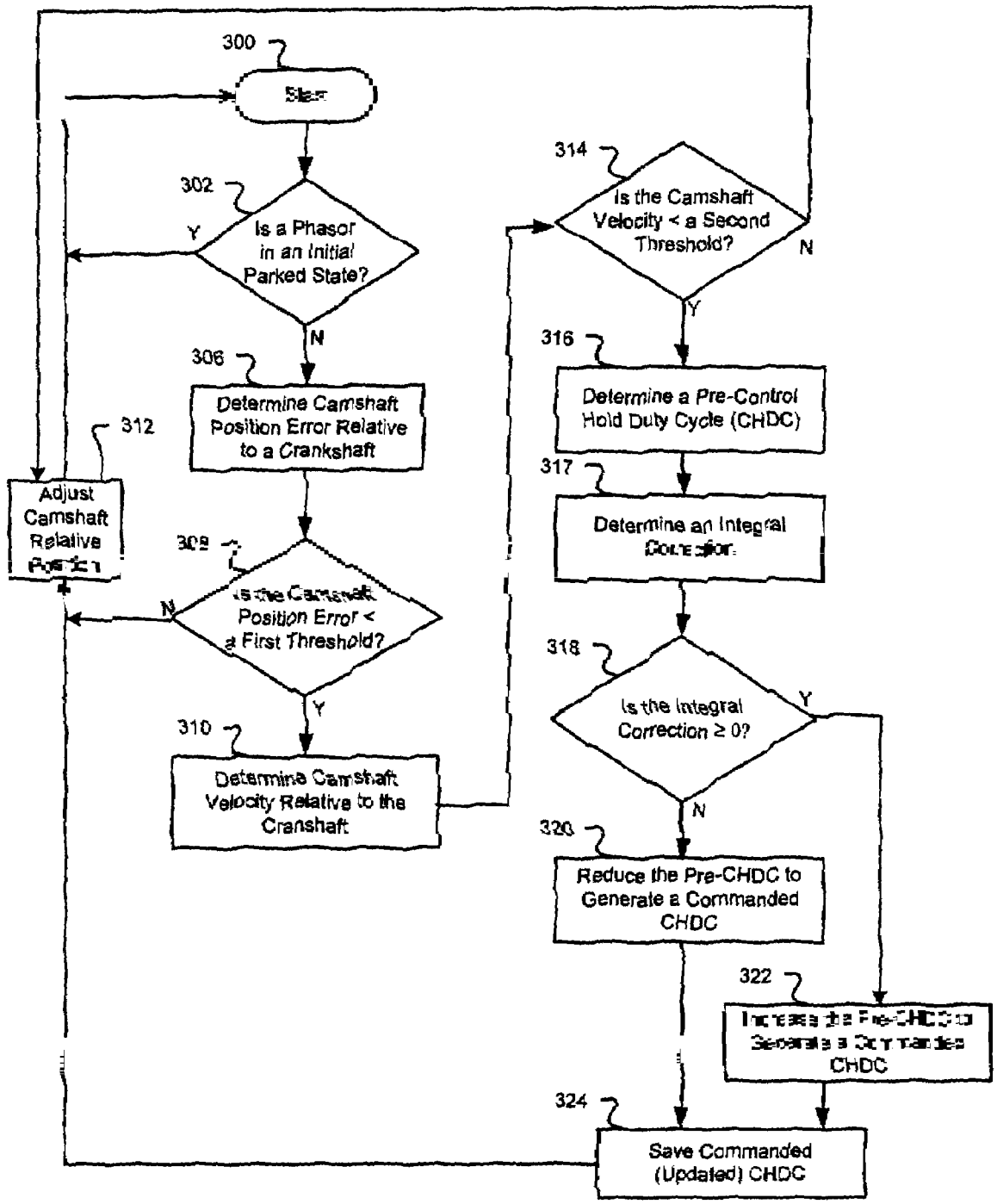
FIG. 5 is a logic flow diagram illustrating a method of operating a camshaft phasor control system in accordance with an embodiment of the present disclosure.

Referring to FIG. 5, a flow diagram illustrating a method of operating a camshaft phasor control system is shown and begins at step 300. Although the following steps are primarily described with respect to the embodiments of FIGS. 1-4, they may be easily modified to apply to other embodiments of the present invention. Also, the below steps are described with respect to a single camshaft and control thereof, the steps may be applied to any number of camshafts. Also, the control described below may be performed by a control module, such as the control module 40, of a camshaft phasor control system.

In step 302, a park state detector, such as the park state detector 60, determines if a phasor is in an initial parked state. When the phasor is commanded to its initial parked state control returns to step 300, otherwise control proceeds to step 306.

In step 306, a camshaft angular position error signal is generated. The camshaft angular position error signal may be generated as described above with respect to the second comparator 206 of the embodiment of FIG. 4.

In step 308, when the camshaft angular position error signal is less than a first threshold, control proceeds to step 310, otherwise control proceeds to step 312. The first threshold may be a predetermined value stored in memory.

In step 310, the change in camshaft velocity relative to the crankshaft is determined. When the relative camshaft angular position approaches a commanded camshaft angular position, the relative change in velocity between the associated camshaft and crankshaft decreases.

In step 312, the camshaft angular position is adjusted relative to the crankshaft. The camshaft angular position is adjusted to match the commanded camshaft angular position and adjust for camshaft position error. Control may perform step 312 while performing steps 300-314. Correction signals are generated. The correction signals may include a proportional correction signal, an integral correction signal, etc.

In step 314, when the change in camshaft velocity relative to velocity of the crankshaft is less than a second threshold, control proceeds to step 316. Other wise, control may return to step 312, as shown, or may return to step 300. The second threshold may be a predetermined value that is stored in memory. When the current camshaft angular position matches the commanded camshaft angular position and the relative change in velocity is below a second threshold, a valve shuttle of the phasor is held in a fixed position.

In step 316, a pre-CHDC value is generated. The pre-CHDC value may be generated by the CHDC module as described above with respect to the embodiment of FIG. 4. The pre-CHDC value may be an initially stored CHDC value, a calculated CHDC value, a CHDC value from a previous operating event, or a CHDC value previously generated during performance of any of steps 300-324. The solenoid force and the valve shuttle positioning force of a camshaft phasor are sensitive to temperature and energy source voltage. Thus, to account for this sensitivity to temperature and energy source voltage, the camshaft phasor control system determines the amount of control energy to locate the valve shuttle to a control hold position.

In step 317, an integral correction signal may be determined, such as the integral gain signal 238. Other correction signals, as described herein, may also be generated.

In step 318, control determines whether the integral correction signal is greater than or equal to zero. When the integral correction signal is greater than or equal to zero, the integral correction signal is summed with the pre-CHDC value to generate a commanded (updated) CHDC signal. When the integral correction signal is less than zero, the integral correction signal is subtracted from the pre-CHDC value to generate a commanded (updated) CHDC signal. Thus, the commanded CHDC signal or actual duty cycle delivered to the phasor is the sum of a control hold value and a value supplied by a position controlling algorithm (i.e. PI, PID, etc.).

In step 320, the pre-CHDC value is decreased based on the integral correction signal to generate the commanded CHDC signal. In step 322, the pre-CHDC value is increased based on the integral correction signal to generate the commanded CHDC signal In step 324, the commanded CHDC signal is saved and provided to the solenoid of the phasor to hold the valve shuttle in a fixed position. Upon completion of step 324 control returns to step 300. The commanded CHDC value may replace the pre-CHDC value in a memory, such as the memory 214. This allows for adaptive adjustment in CHDC values, such as in a table of the memory. The table values may be continuously updated, replaced, and/or used to generate new CHDC values. The commanded CHDC value or learned value may be calculated differently than provided in steps 318-322. For example, the commanded CHDC value may be calculated by multiplying the pre-CHDC value by a predetermined percentage of an integral correction value. This limits the amount that a pre-CHDC value changes in a single iteration.

The above-described steps may be continuously repeated. The above-described steps are meant to be illustrative examples; the steps may be performed sequentially, synchronously, simultaneously, during overlapping time periods or in a different order depending upon the application.

The embodiments disclosed herein provide adaptive camshaft phasor control systems that account for changes in engine state parameters and adjusts for changes in engine components, such as due to wear over time.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A camshaft phasor control system for an engine comprising:
    a camshaft position sensor generating a current camshaft position signal based on position of a camshaft;
    a first comparator that generates a camshaft position signal based on said current camshaft position signal and a crankshaft position;
    a second comparator that generates an error signal based on said current camshaft position signal and a commanded camshaft position signal; and
    a control module that: determines a current control hold duty cycle (CHDC) for a camshaft phasor based on an engine state parameter; generates a correction signal based on said error signal; adjusts said current CHDC based on said correction signal to generate a commanded duty cycle signal; and generates another CHDC based on said commanded duty cycle signal.

2. The camshaft phasor control system of claim 1 further comprising a parked state detector that generates a parked signal,
    wherein said control module generates said current CHDC based on said parked signal.

3. The camshaft phasor control system of claim 1 wherein said control module generates said current CHDC when said error signal is less than a first threshold.

4. The camshaft phasor control system of claim 1 wherein said control module generates said current CHDC when change in velocity of said camshaft relative to said crankshaft is less than a second threshold.

5. The camshaft phasor control system of claim 1 wherein said current CHDC is generated based on an oil temperature of the engine.

6. The camshaft phasor control system of claim 1 wherein said current CHDC is generated based on a voltage of an energy source of the engine.

7. The camshaft phasor control system of claim 1 wherein said correction signal includes an integral gain value.

8. The camshaft phasor control system of claim 1 further comprising a parked state detector that generates a parked signal,
    wherein said control module generates said current CHDC based on said parked signal.

9. The camshaft phasor control system of claim 1 wherein said control module generates said current CHDC when said error signal is less than a first threshold.

10. The camshaft phasor control system of claim 1 wherein said control module generates said current CHDC when change in velocity of said camshaft relative to said crankshaft is less than a second threshold.

11. An adaptive camshaft phasor control system for an engine comprising:
    memory that stores control hold duty cycle (CHDC) values;
    a camshaft position sensor generating a current camshaft position signal based on position of a camshaft;
    a first comparator that generates a relative camshaft position signal based on said current camshaft position signal and a crankshaft position;
    a second comparator that generates an error signal based on said relative camshaft position signal and a commanded camshaft position signal; and
    a control module that: determines a CHDC value for a camshaft phasor based on an engine state parameter; generates a correction signal based on said error signal; adjusts said CHDC value based on said correction signal to generate a commanded duty cycle signal; and stores said commanded duty cycle signal in said memory.

12. The camshaft phasor control system of claim 11 wherein said control module accesses said memory to obtain said commanded duty cycle signal and generates a new CHDC based on said commanded duty cycle signal.

13. The camshaft phasor control system of claim 11 wherein said memory is selected from at least one of a volatile memory and a non-volatile memory.

14. The camshaft phasor control system of claim 11 wherein said current CHDC is generated based on an oil temperature of the engine.

15. The camshaft phasor control system of claim 11 wherein said current CHDC is generated based on a voltage of an energy source of the engine.

16. The camshaft phasor control system of claim 11 wherein said correction signal includes an integral gain value.

17. A method of operating a camshaft phasor control system comprising:
- determining a control hold duty cycle (CHDC) for a camshaft phasor based on an engine state parameter;
- generating a commanded camshaft position signal;
- determining a current camshaft position relative to a crankshaft;
- generating an error signal based on said commanded camshaft position signal and said current camshaft position;
- generating a correction signal based on said error signal;
- adjusting said CHDC based on said correction signal to generate a commanded duty cycle signal; and
- storing said commanded duty cycle signal in memory.

18. The method of claim 17 wherein said CHDC is determined based on an engine oil temperature and a voltage of an energy source.

19. The method of claim 17 further comprising;
- accessing said memory to obtain said commanded duty cycle signal;
- generating a new CHDC based on said commanded duty cycle signal; and
- adjusting said new CHDC based on another correction signal to generate an updated duty cycle signal.

20. The method of claim 19 further comprising:
- generating a parked signal that is indicative of whether a vehicle is parked; and
- generating said new CHDC based on said parked signal.

* * * * *